US005596027A

United States Patent [19]
Mead et al.

[11] Patent Number: 5,596,027
[45] Date of Patent: Jan. 21, 1997

[54] CONDENSATION AND WATER RESISTANT JET INK

[75] Inventors: Sharon B. Mead, Hanover Park; Susan J. Brennan, Downers Grove; Arsenia Morelos, Glendale Heights; Josephine Aguilar, Elk Grove Village, all of Ill.

[73] Assignee: Videojet Systems International, Inc., Wood Dale, Ill.

[21] Appl. No.: 502,330

[22] Filed: Jul. 13, 1995

[51] Int. Cl.$^6$ .............................. C09D 5/00; C09D 11/00; C08K 3/18

[52] U.S. Cl. ..................... 523/161; 524/432; 524/495; 524/514; 524/522; 106/200; 106/20 R; 106/22 R; 525/183; 525/185; 525/327.6; 525/329.9

[58] Field of Search ..................... 524/432, 495, 524/514, 522; 523/161; 106/20 D, 20 R, 22 R; 525/183, 185, 327.6, 329.9

[56] References Cited

U.S. PATENT DOCUMENTS

| | | | |
|---|---|---|---|
| 3,060,429 | 10/1962 | Winston | 346/1 |
| 3,298,030 | 1/1967 | Lewis et al. | 346/75 |
| 3,373,437 | 3/1968 | Sweet et al. | 346/75 |
| 3,416,153 | 12/1968 | Hertz et al. | 346/75 |
| 3,673,601 | 6/1972 | Hertz | 346/75 |
| 4,155,768 | 5/1979 | Adams et al. | 106/23 |
| 4,197,135 | 4/1980 | Bailey et al. | 106/23 |
| 4,507,466 | 3/1985 | Tomalia et al. | 528/332 |
| 4,558,120 | 12/1985 | Tomalia et al. | 528/363 |
| 4,568,737 | 2/1986 | Tomalia et al. | 528/332 |
| 4,587,329 | 5/1986 | Tomalia et al. | 528/363 |
| 4,631,337 | 12/1986 | Tomalia et al. | 528/391 |
| 4,680,332 | 7/1987 | Hair et al. | 524/377 |
| 4,692,188 | 9/1987 | Ober et al. | 106/23 |
| 4,880,465 | 11/1989 | Loria et al. | 106/20 |
| 5,080,716 | 1/1992 | Aoki et al. | 106/20 |
| 5,098,475 | 3/1992 | Winnik et al. | 106/22 |
| 5,100,470 | 3/1992 | Hindagolia et al. | 106/22 |
| 5,116,409 | 5/1992 | Moffatt | 106/22 |
| 5,120,361 | 6/1992 | Winnik et al. | 106/22 |
| 5,131,949 | 7/1992 | Tochihara et al. | 106/20 |
| 5,178,671 | 1/1993 | Yamamoto et al. | 106/22 |
| 5,207,825 | 5/1993 | Schwarz, Jr. | 106/22 |
| 5,213,613 | 5/1993 | Nagashima et al. | 106/20 |
| 5,215,577 | 6/1993 | Eida et al. | 106/22 |
| 5,254,158 | 10/1993 | Breton et al. | 106/20 |
| 5,254,159 | 10/1993 | Gundlach et al. | 106/22 |
| 5,256,193 | 10/1993 | Winnik et al. | 106/21 |
| 5,266,106 | 11/1993 | Winnik et al. | 106/22 |
| 5,275,647 | 1/1994 | Winnik | 106/22 |
| 5,316,575 | 5/1994 | Lent et al. | 106/20 |
| 5,360,472 | 11/1994 | Radigan, Jr. et al. | 106/22 |
| 5,380,769 | 1/1995 | Titterington et al. | 523/161 |

FOREIGN PATENT DOCUMENTS 2105735  3/1983  United Kingdom.

OTHER PUBLICATIONS

Kuhn et al., "Ink–Jet Printing", *Scientific American*, Apr., 1979, pp. 162–166, 168, 170, 172, 175, 176, 178.

Keeling, "Ink Jet Printing", *Phys. Technol.*, 12(5), pp. 196–203 (1981).

Hawker et al., "Preparation of Polymers with Controlled Molecular Architecture. A New Convergent Approach to Dendritic Macromolecules", *J. Am. Chem. Soc.*, vol. 112, No. 21, (1990), pp. 7638–7647.

Tomalia et al., "Starburst Dendrimers", *Angew. Chem. Int. Ed. Engl.*, 29 (1990), pp. 138–175.

*Primary Examiner*—Paul R. Michl
*Assistant Examiner*—LaVonda R. DeWitt
*Attorney, Agent, or Firm*—Leydig, Voit & Mayer, Ltd.

[57] ABSTRACT

The present invention provides jet ink compositions that produce on glass, metal, plastic, and rubber surfaces messages having high visual intensity, and condensation and water resistance. The inventive compositions comprise a polyamine, a colorant, and an acidic resin. The present invention further provides jet ink compositions further comprising water as the ink carrier. The colorant used in the ink composition of the present invention includes a dye, a pigment, or a polymeric hollow microsphere. The polyamine used in the ink composition of the present invention includes a dendrimer. The ink composition of the present invention may additionally include pH adjusting agents, humectants, biocides, defoamers. The present invention further provides an improved process of jet printing on glass, metal, plastic, and rubber surfaces messages having improved condensation and water resistance, and improved visual intensity, the improvement comprising using the ink composition of the present invention.

47 Claims, No Drawings

CONDENSATION AND WATER RESISTANT JET INK

FIELD OF THE INVENTION

The present invention relates to ink jet printing ink compositions suitable for printing on substrate surfaces, particularly for printing on surfaces such as metal, glass, plastic, and rubber surfaces that may be subjected to cold water as well as cold and hot humid conditions, and to related methods of printing.

BACKGROUND OF THE INVENTION

Ink jet printing is a well-known technique by which printing is accomplished without contact between the printing device and the substrate on which the printed characters are deposited. Briefly described, ink jet printing involves the technique of projecting a stream of ink droplets to a surface and controlling the direction of the stream electronically so that the droplets are caused to form the desired printed message on that surface.

The technique of jet ink printing or non-contact printing is particularly well suited for application of characters onto irregularly shaped surfaces, including, for example, the bottom of glass, metal, or plastic containers, generally used for holding beverage, cosmetic, pharmaceutical, liquor, and health care products.

Reviews of various aspects of ink jet printing can be found in these publications: Kuhn et al., *Scientific American*, April, 1979, 162–178; and Keeling, *Phys. Technol.*, 12(5), 196–303 (1981). Various ink jet apparatuses are described in the following U.S. Pat. Nos.: 3,060,429, 3,298,030, 3,373,437, 3,416,153, and 3,673,601.

In general, an ink jet composition must meet certain rigid requirements to be useful in ink jet printing operations. These relate to viscosity, resistivity, solubility, compatibility of components and wettability of the substrate. Further, the ink must be quick-drying and smear resistant, resist rubbing, and be capable of passing through the ink jet nozzle without clogging, and permit rapid cleanup of the machine components with minimum effort.

In addition, the ink must meet certain other requirements. The messages printed on the substrates must resist moisture. The bottles, such as beverage bottles, may be exposed to humid conditions during warehousing and shipping to different parts of the country and in different seasons. The messages should not be damaged by the hot and cold humid conditions. If condensation occurred on the surface, the printed messages should not be damaged by the condensation. In addition, if the containers such as beer bottles or cans are immersed in ice water for chilling, the messages should not disintegrate or be damaged by the ice water.

There has been significant developmental activity in the area of ink compositions suitable for ink jet printing, and several jet ink compositions are known. Some examples of known inks are set forth below.

UK patent application Serial No. GB 2,105,735 discloses a jet ink composition comprising an oil soluble dye-impregnated polyurethane latex dispersed in an aqueous medium.

U.S. Pat. No. 4,155,768 discloses an ink for use in ink jet printers which contains a water soluble dye and a polyamine containing 6 or fewer nitrogen atoms per molecule, with the ink having a pH of 8 or below.

U.S. Pat. No. 4,197,135 discloses an ink for use in ink jet printers which contains a water soluble dye and a polyamine containing 7 or more nitrogen atoms per molecule, with the ink composition having a pH of 8 or above.

U.S. Pat. No. 4,680,332 discloses a jet ink composition comprising a water insoluble polymer such as a polyacrylate dispersed in a liquid medium, the polymer containing therein an oil soluble dye, and a nonionic stabilizer permanently attached thereto.

U.S. Pat. No. 4,692,188 discloses a process for the preparation of jet ink compositions, comprising (1) dissolving in a water-immiscible organic solvent a polymer composition and an organic oil soluble dye; (2) adding an aqueous phase water surfactant mixture thereto; (3) affecting emulsification thereof; and (4) subsequently evaporating from the aforementioned mixture the solvent thereby resulting in an ink with the dye trapped in the polymer particles suspended in the aqueous phase. The polymer compositions include polycarbonates, polystyrene, polymethacrylates and copolymers thereof.

U.S. Pat. No. 5,080,716 discloses a jet ink composition comprising a recording agent, a liquid medium capable of dissolving or dispersing the recording agent, and a substituted benzene or toluene sulfonamide compound.

U.S. Pat. No. 5,098,475 discloses an ink composition comprising a solution with a dendrimer colored with a dye or dyes covalently attached thereto.

U.S. Pat. No. 5,100,470 discloses an ink jet ink comprising a water soluble dye, water with or without a water soluble organic solvent, and sufficient polyalkylene polyamine to provide the ink with a pH of at least 9.

U.S. Pat. No. 5,120,361 discloses an aqueous ink composition comprised of a dendrimer, and a dye.

U.S. Pat. No. 5,131,949 discloses a jet ink composition including a recording agent, a liquid medium capable of dissolving or dispersing the recording agent, and a compound having an amide group.

U.S. Pat. No. 5,207,825 discloses a jet ink composition which comprises an aqueous liquid vehicle, a colorant, and a polymeric additive which is a substituted bisphenol A derivative.

U.S. Pat. No. 5,213,613 discloses a jet ink comprising a recording agent and a liquid medium capable of dissolving or dispersing the recording agent therein, wherein the ink contains an imide compound and at least one compound selected from the group consisting of urea, thiourea and derivatives thereof, and volatile alkaline compounds.

U.S. Pat. Nos. 5,215,577 and 5,178,671 disclose jet ink compositions comprising a recording agent and a liquid medium for dissolution or dispersion thereof, the recording agent being an aromatic sulfonated diazo compound.

U.S. Pat. No. 5,254,158 discloses an ink composition which comprises an aqueous liquid vehicle, a colorant, and an additive selected from the group consisting of amine alkoxylates, sorbitan monoester alkoxylates, alkylene oxide adducts of glycerin, and mixtures thereof.

U.S. Pat. No. 5,254,159 discloses an ink composition comprising water, an anionic dye, and a polyamine such as N,N'-bis(3-aminopropyl)-1,2-ethylenediamine or a dendrimer.

U.S. Pat. No. 5,256,193 discloses an aqueous ink composition comprised of a dendrimer, and a dye comprised of a porphyrin chromophore.

U.S. Pat. No. 5,266,106 discloses an aqueous ink composition comprised of a dye and a grafted dendrimer such as a dendrimer grafted with a nonionic alkylene oxide oligomer.

Many of the aforementioned patents disclosing ink compositions do not address the condensation and water resistance of printed messages on glass, metal, plastic, and rubber surfaces, and the ink compositions are considered generally not suitable for providing water resistant messages on glass, metal, plastic, and rubber surfaces.

Thus, there exists a need for jet ink compositions meeting certain rigid requirements. There exists a need for jet ink compositions that provide high quality messages on surfaces such as glass, metal, plastic, and rubber container surfaces. There exists a need for jet ink compositions whose printed messages resist moisture. There exists a need for jet ink compositions whose dried messages do not smear or degrade when exposed to hot and cold humid conditions. There exists a need for jet ink compositions whose printed messages do not smear or degrade when the dried messages are exposed to ice water.

It is therefore an object of the present invention to provide jet ink compositions that provide high quality messages on surfaces such as glass, metal, plastic, and rubber container surfaces. It is also an object of the present invention to provide jet ink compositions whose printed messages resist moisture. It is a further object of the present invention to provide jet ink compositions whose printed messages do not smear or degrade when exposed to hot and/or cold humid conditions. It is also an object of the present invention to provide jet ink compositions whose printed messages do not smear or degrade when exposed to ice water.

SUMMARY OF THE INVENTION

The foregoing needs have been fulfilled by the present invention which provides jet ink compositions that produce high quality messages on surfaces such as glass, metal, plastic, and rubber container surfaces. The present invention further provides jet ink compositions whose printed messages resist moisture. The present invention further provides jet ink compositions whose printed messages do not smear or degrade when exposed to hot and cold humid conditions. The present invention further provides jet ink compositions whose printed messages do not smear or degrade when exposed to ice water.

The present invention provides jet ink compositions comprising a polyamine, a colorant, and an acidic resin. The present invention further provides jet ink compositions further comprising water as the ink carrier. The colorants used in the ink composition of the present invention include dyes, pigments, polymeric hollow microspheres, and combinations thereof. The polyamine used in the ink composition of the present invention includes a dendrimer. The ink composition of the present invention may additionally include pH adjusting agents, humectants, biocides, and defoamers.

The present invention further provides an improved process of jet printing on glass, metal, plastic, and rubber surfaces, the messages having condensation resistance and water resistance, the improvement comprising using the ink composition of the present invention.

While the invention has been described and disclosed below in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

The present invention provides jet ink compositions that produce high quality messages on substrate surfaces such as glass, metal, plastic, and rubber container surfaces. The present invention provides jet ink compositions that produce messages having high visual intensity. The present invention further provides ink compositions which resist condensation. The present invention also provides jet ink compositions that do not smear or degrade when exposed to water. The present invention also provides jet ink compositions that do not smear or degrade when exposed to cold and/or hot humid conditions.

The ink composition of the present invention, in general, exhibits the following characteristics for use in ink jet printing systems: (1) a viscosity of from about 3 centipoises (cps) to about 5 cps at 25° C.; (2) an electrical resistivity of from about 20 ohm-cm to about 250 ohm-cm; and (3) a sonic velocity of from about 1500 meters/second to about 1700 meters/second.

The present invention provides jet ink compositions comprising a colorant, a polyamine, and an acidic resin having an acid functionality. The ink compositions of the present invention further comprise a suitable ink carrier. The jet ink composition may preferably comprise other components such as a pH adjusting agent, a humectant, a biocide, and a defoamer.

The ink composition of the present invention can be prepared by any suitable method known to those of ordinary skill in the art. For instance, the components of the composition can be combined and mixed in a suitable mixer or blender. A detailed discussion of each of the components and the characteristics of the inventive ink composition are set forth below.

Ink Carrier

Any suitable ink carrier, including aqueous and nonaqueous carriers, can be used in the preparation of the ink composition of the present invention. Water is a preferred ink carrier. Any suitable amount of ink carrier can be used. Typically the carrier is used in an amount of from about 30% weight to about 80% by weight, preferably in an amount of from about 40% by weight to about 70% weight of the composition. When water is used as the carrier, in order to prevent the clogging of ink jet tip by the dissolved salts present in the water, it is preferred that deionized water is used in the preparation of the ink composition.

Polyamine

The ink composition of the present invention comprises a polyamine. Any suitable polyamine having greater than one amino group per molecule is suitable for use in the ink composition of the instant invention. It is believed that the amino group of the polyamine interacts with the acidic resin to provide a durable printed message that resists condensation and that does not smear or damage when exposed to water. The interaction between the polyamine and the acidic resin is not fully understood, and it is believed that it may involve interactions such as formation of covalent, ionic, hydrogen bonding, or other interactions such as van der Waals interactions such as dipole-dipole interactions, dipole-induced dipole interactions, or combinations thereof.

It is also believed that polyamine and the surface of the substrate interact suitably to provide a durable bond between the substrate surface and the components of the printed message. Thus, it is believed that the surface groups, such as the amino groups on the polyamine, interact with the surface groups on the substrate.

The polyamine may be a small molecule such as ethylenediamine, or a polymeric molecule such as polyethyleneimine. The polymeric molecule may be linear, branched, cross-linked, or three-dimensional.

Examples of suitable polyamines include N,N'-bis(3-aminopropyl)-1,2-ethylenediamine, 1,4-bis(3-aminopropyl)piperazine, N,N'-bis(3-aminopropyl)-1,4-butanediamine, ethylenediamine, diethylenetriamine, triethylenetetramine, tetraethylenepentamine, nitrilotrisethylamine, N,N'-(diaminoethyl)piperazine, piperazinylethylethylenediamine, aminoethyltriethylenetetramine, aminoethylpiperazinylethylethylenediamine, piperazinylethyldiethylenetriamine, pentaethylene hexamine, and mixtures thereof.

A preferred polyamine is a dendrimer. Dendrimers are radially symmetrical molecules of a STARBURST™ topology comprised of an initiator core, such as nitrogen, ethyleneimine, and the like, interior layers attached to the core and comprised of a suitable number of arms, for instance, two to four arms, each arm being comprised of repeating units with the number of repeating units in each arm being considered the generation of the dendrimer, and terminal groups functionality, such as, for example, a primary amine attached to the outmost generation, which dendrimers are illustrated, for example, in U.S. Pat. Nos. 4,507,466; 4,631,337, 4,558,120, 4,568,737, and 4,587,329, and in Tomalia et al., *Angewandte Chemie*, Int. Ed. Engl. 29, 138 (1990). The size and shape of the STARBURST™ dendrimer molecule and the functional groups present in the dendrimer molecule can be controlled by the choice of the initiator core, the number of generations, and the choice of repeating units employed at each generation.

The choice of the dendrimer components can affect the properties of the dendrimers. The initiator core type can affect the dendrimer shape producing, for example, spheroid-shaped dendrimers, cylindrical- or rod-shaped dendrimers, or ellipsoid-shaped dendrimers. Sequential building of generations determines the dimensions of the dendrimers and the nature of its interior. Examples of suitable core materials include ammonia, polyfunctional alcohols, such as pentaerythritol or tris-(hydroxymethyl)ethane, 1,1,1-tris-(4'-hydroxyphenyl)ethane, polyfunctional amines, such as ethylene diamine, linear polyethyleneimines, and the like. The chemical functionality of the repeating unit in the interior layers can include, for example, amidoamines, such as aminoethyl acetamide, imines, such as diethylene diimine, or ethers like those obtained from materials such as, for example, 3,5-dihydroxyethyl benzyl alcohol. The terminal functionalities include, for example, amino groups, hydroxyl groups, carboxylic acid groups, carboxylates, esters, amides, phosphates, sulfonates, and the like. The synthesis of dendrimers usually occurs by a divergent approach that involves the initial reaction of a monomer with the initiator core, followed by exhaustive reaction of the resulting functional groups with a difunctional compound, such as a diamine, including, for example, ethylene diamine, to afford the next generation of reactive amino groups. Thus, for example, ethylene diamine can be suitably reacted first with methyl acrylate to produce a compound such as N,N,N',N'-tetra(methoxycarbonylethyl)ethylene diamine. The aforesaid compound can be reacted in the next step with ethylene diamine to produce an amidoamine dendrimer having a generation number of zero, a molecular weight of 517, and four primary amino groups at the surface. Repetition of the above two-step procedure leads to subsequent generations.

An alternate synthetic route uses a convergent growth synthesis as described in detail in Hawker et al., *J. Amer. Chem. Soc.*, 112, 7638 (1990).

The dendrimer may have other groups or segments, in addition to amino groups. For instance, the dendrimer may have a dye covalently attached to it, or it may have certain functional groups grafted onto it.

The dendrimers may be grafted with, for example, alkylene oxide oligomers or polymers, wherein the alkylene has 1–12 carbon atoms and the degree of polymerization of the alkylene oxide is in the range of from about 2 to about 100. The amount of grafting can be in any suitable range, preferably below 50% of the amino groups, and even more preferably below 10% of the amino groups. Grafting of ethylene oxide on the dendrimer can be performed by any suitable means known to those of ordinary skill in the art. For instance, a polyethylene glycol monomethyl ether of suitable molecular weight can be converted to polyethylene glycol monomethyl ether p-toluene sulfonate by suitably reacting with p-toluenesulfonyl chloride and pyridine, and the sulfonate then reacted with the dendrimer under suitable conditions, as known to those of ordinary skill in the art. Grafted dendrimers can also be obtained from Dendritech, Inc. in Midland, Mich.

Preferred dendrimers for use in the preparation of the ink composition of the present invention include those having terminal amine functionality at the surface. It is further preferred that the dendrimer has a molecular weight in the range from about 300 to about 100,000, a generation number of from 0 to 10, a surface amine group concentration of from about 3 to about 4,100, and a molecular diameter of from about 10 Å to about 10,000 Å. More preferred dendrimers are those having terminal primary amine functionality. It is also more preferred that the dendrimer has a molecular weight in the range from about 500 to about 30,000, a generation number of from 0 to about 5, a surface group concentration of from about 4 to about 150, and a molecular diameter of from about 10 Å to about 150 Å. It is also preferred that the polydispersity index (Mw/Mn) of the dendrimer is low, preferably in the range of from about 1.1000 to about 1.0001, and more preferably in the range of from about 1,001 to about 1.0001. Examples of dendrimers prepared by the divergent approach include the STARBURST™ dendrimers available from Dendritech, Inc. The generation number, the molecular weight and the number of surface groups are set forth below.

| Generation | Molecular Weight | No. of Surface Groups |
|---|---|---|
| 0 | 517 | 4 |
| 1 | 1430 | 8 |
| 2 | 3256 | 16 |
| 3 | 6909 | 32 |
| 4 | 14215 | 64 |
| 5 | 28826 | 128 |
| 6 | 58048 | 256 |
| 7 | 116493 | 512 |
| 8 | 233383 | 1024 |
| 9 | 467162 | 2048 |
| 10 | 934720 | 4096 |

The above Starburst dendrimers from Dendritech, Inc. are polyamidoamines (PAMAMs) having primary amine terminal surface functionality, and made of ethylene diamine core and sequenced copolymers of ethylene diamine and methyl acrylate. They have a polydispersity index of 1.0007.

The polyamine is present in the ink composition in an amount sufficient to provide sufficient adhesion of the ink components to the printing surface, and also to provide sufficient water resistance and cold and hot humidity resistance. The amount of the polyamine is preferably in the range of from about 0.1% to about 10% by weight, more preferably in the range of from about 0.5% to about 2% by weight, and even more preferably in the range of from about 1% by weight to about 2% by weight, of the ink composition.

Colorants

The ink composition of the present invention comprises a colorant. Any suitable colorant can be used. Colorants suitable for use in the present invention include pigments, dyes, hollow microspheres which provide opacity to the ink composition, and combinations thereof.

Examples of suitable pigments include Metallized Azo Reds such as Red 49:1 (Barium salt), Red 49:2 (Calcium salt), Red 63:1 (Calcium salt), Toluidine Reds, Naphthol Reds, Pyrazalones, Rhodamines, Quinacridones such as Red B, Red Y, Magenta B, Magenta and Violet, Phthalocyanine Blues, Phthalocyanine Greens, Carbazole Yellow, Monoarylide Yellow, Diarylide Yellow, Chrome Yellow, Red Lake C, Lithol Reds such as calcium and barium salts, Lithol Rubine, Bon Maroon, Perylene pigments, Red 2B pigments including the calcium, barium and magnesium salts, Chrome yellow, Chrome Orange, Molybdate Orange, Lead Chromes, Lead Silicochromates, Zinc Chromes, barium chromate, strontium chromate, titanium nickel yellow, Liminites, Haematite, Magnetite, Micaceous Oxides of Iron, Siderite, Iron Pyrites, Ferrite Yellow, Red Oxide, Prussian Blue, Orange 36, Diarylide Orange, Dianisidine Orange, Tolyl Orange, and Dinitraniline Orange. Other suitable examples of pigments include lakes, for instance, lakes formed from acid dyes and alkali or alkaline earth metals. Examples of acid dyes suitable for forming such lakes include Peacock Blue, Scarlet 2R, Azo Bordeaux, Pigment Scarlet 3B, Orange 2, and Tartrazine. Carbon black is a preferred colorant for use in digital duplicator ink formulations of the instant invention. Carbon black colorant includes Channel black, furnace black, and lamp black. Other examples of suitable pigments include hiding pigments such as titanium dioxide-anatase and rutile, zinc oxide, zinc sulfide, and lithopone.

The colorants suitable for use in the ink of the present invention may have a wide range of particle sizes as from about 0.01 microns to about 100 microns, preferably from about 0.01 microns to about 5 microns, and more preferably from 0.01 microns to 2 microns.

The ink composition of the present invention can also be prepared using any suitable dye. Examples of dyes suitable for use in the ink composition of the present invention include, but are not limited to, the yellow dyes such as C.I. Solvent Yellow 19 (C.I. 13900A), C.I. Solvent Yellow 21 (C.I. 18690), C.I. Solvent Yellow 61, C.I. Solvent Yellow 80, FD&C Yellow #5, Yellow Shade 16948, Acid Yellow 23, Levaderm Lemon Yellow (Mobay), Spirit Fast Yellow 3G, Aizen Spilon Yellow C-GNH (Hodagaya Chemical Co.), Pergasol Yellow CGP (Ciba-Geigy), and the like, the orange dyes such as C.I. Solvent Orange 1 (C.I. 11920), C.I. Orange 37, C.I. Orange 40, Diaresin Orange K (Mitsubishi Chemical Industries, Ltd.), Diaresin Orange G (Mitsubishi Chemical Industries, Ltd.), Sumiplast Orange 3G (Sumitomo Chemical Co., Ltd.), and the like, red dyes such as C.I. Solvent Red 8, C.I. Solvent Red 81, C.I. Solvent Red 82, C.I. Solvent Red 84, C.I. Solvent Red 100, Cibacron Brilliant Red 38-A (Aldrich Chemical Co.), Drimarene Brilliant Red E-6A (Pylam, Inc.), Acid Red 92, Reactive red 31 (ICI America), and the like, pink dyes such as Diaresin Pink M (Mitsubishi Chemical Industries, Ltd.), Sumiplast Pink RFF (Sumitomo Chemical Co.), Direct Brill Pink B Ground Crude (Crompton & Knowles), and the like, violet dyes such as C.I. Solvent Violet 8, C.I. Solvent Violet 21, Diaresin Violet (Mitsubishi), Diaresin Violet D, Sumiplast Violet RR (Sumitomo), and the like, blue dyes such as C.I. Solvent Blue 2, C.I. Solvent Blue 11, C.I. Solvent Blue 25, C.I. Solvent Blue 36, C.I. Solvent Blue 55, and the like, green dyes such as C.I. Solvent Green 3 and the like, brown dyes such as C.I. Solvent Brown 3 and Diaresin Brown A (Mitsubishi), and the like, black dyes such as C.I. Solvent Black 3, C.I. Solvent Black 5, C.I. Solvent Black 7, C.I. Solvent Black 22, C.I. Solvent Black 27, C.I. Solvent Black 29, Acid Black 123, and the like.

Other examples of suitable dyes include Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, available from Bayer, Procion Turquoise PA, Procion Turquoise HA, Procion Turquoise H-5G, Procion Turquoise H-7G, Procion Red MX-5B, Procion Red MX 8B GNS, Procion Red G, Procion Yellow MC-8G, Procion Black H-EXL, Procion Black P-N, Procion Blue MX-R, Procion Blue MX-4GD, Procion Blue MX-G, and Procion Blue MX-2GN, available from ICI, Cibacron Red F-B, Cibacron Black BG, Lanasol Black B, Lanasol Red 5B, Lanasol Red B, and Lanasol Yellow 4G, available from Ciba-Geigy, Basilen Black P-BR, Basilen Yellow EG, Basilen Brilliant Yellow P-3GN, Basilen Yellow M-6GD, Basilen Brilliant Red P-3B, Basilen Scarlet E-2G, Basilen Red E-B, Basilen Red E-7B, Basilen Scarlet E-2G, Basilen Red E-B, Basilen Red E-7B, Basilen Red-M5B, Basilen Blue E-R, Basilen Brilliant Blue P-3R, Basilen Black P-BR, Basilen Turquoise Blue P-GR, Basilen Turquoise M-2G, Basilen Turquoise E-G, and Basilen Green E-6B, available from BASF, Sumifix Turquoise Blue G, Sumifix Turquoise Blue H-GF, Sumifix Black B. Sumifix Black H-BG, Sumifix Yellow 2GC, Sumifix Supra Scarlet 2GF, and Sumifix Brilliant Red 5BF, available from Sumitomo Chemical Company, Intracron Yellow C-8G, Intracron Red C-8B, Intracron Turquoise Blue GE, Intracron Turquoise HA, and Intracron Black RL, available from Crompton and Knowles, Dyes and Chemicals Division, Duasyn Black RL-SF, Duasyn Brilliant Yellow GL-SF, Duasyn Brilliant Red F3B-SF, and Duasyn Red 3B-SF, available from Hoechst, Reactive Yellow 86, available from Sigma Chemical Company, Reactive Black 5, Reactive Blue 4, Reactive Blue 15, Reactive Orange 16, Reactive Red 4, and Reactive Yellow 2 available from Aldrich Chemical Company Incorporated, and the like. One dye or mixtures of dyes may be selected in embodiments of the present invention.

Examples of other dyes include the FLEXO™ dyes available from BASF Corp. distributor in Clifton, N.J., which include the diarylmethane dyes such as Yellow 105 Low-Dusting (also known as Basic Yellow 2203), Yellow 110 (Auramine FA), Yellow 110 Low-Dusting (Auramine FA-NS); Yellow 112 (Auramine FWA), and Yellow 112 Low-Dusting (Auramine FWA-NS), the azomethine dyes such as Yellow 11B Low-Dusting, the monoazo dyes such as Orange 204 (Chrysoidine FL), the xanthene dyes such as Red 480 (Rhodamine 6 GDN Extra), Red 480 Low-Dusting (Rhodamine 6 GD-NS), Red 482 (Rhodamine F5G), Red 482 Low-Dusting (Rhodamine F5G-NS), Red 540 (Rhodamine FB) and Red 540 Low-Dusting (Rhodamine FB-NS), the triarylmethane dyes such as Violet 600 (Methyl Violet FN), Violet 615 (Crystal Violet FN), Blue 630 (Victoria blue FBR), Blue 838 (Victoria Pure Blue FBO), Blue 640 (Victoria Blue F8), Blue 640 Low-Dusting (Victoria Blue FB-NS), Blue 680 (Victoria Pure Blue FGA), and Blue 810 (Victoria Cyan FBG), and mixed dyes such as Green 990 (Spirit Green IY Conc.) and Black XII (Flexo Black GL). Blue 680 (Victoria Pure Blue FGA), a preferred dye, is also known as Basic Blue 81 C.I.

Some of the pigments and dyes are available in convenient dispersions, for instance, from Penn Color Inc. in Doylestown, Pa., and may be used in the preparation of the ink composition of the present invention. For instance, carbon black is available as a dispersion number 91B188C, which contains carbon black 18.0%, an acrylic resin 22.0%, aqueous ammonia 5.5%, an amine 3.5%, water 46.0%, and isopropanol 5.0%. Rhodamine (Blue Shade) is available as a dispersion containing 40% Rhodamine, and phthalocyanine green is available as a dispersion containing 60% phthalocyanine green. All percentages are by weight of the dispersion.

Any of the aforesaid dyes or pigments may also be suitable for use when present attached, for instance, covalently attached, to other molecules or compounds. For instance, the dye may be covalently attached to a dendrimer. Methods of attaching the dyes to dendrimers are known. For instance, U.S. Pat. No. 5,098,475 discloses certain methods of attaching dyes to dendrimer molecules. The dyes having suitable reactive groups such as a dichlorotriazine, a monochlorotriazine, a dichloroquinoxaline, a aminoepoxide, a chlorobenzothiazole, and the like can be used to attach the dye to the dendrimer. The colored dendrimers can have dye molecules attached to their surface in any amount sufficient to impart to the dendrimers the desired intensity and hue of color. Typically, the colored dendrimers contain the dye in an amount of from about 5% to about 90% by weight, and preferably from about 10% to about 80% by weight.

The ink composition of the present invention can also be prepared using non-film forming hollow microspheres as a colorant. The hollow microspheres act to effectively scatter light which is incident thereupon, producing an opaque message. The hollow microspheres may have any suitable diameter, and preferably an inside diameter of from about 0.2 microns to about 0.6 microns, and an outside diameter of from about 0.3 microns to about 0.7 microns. The microspheres can be made of any suitable material. Examples of suitable materials include glass, ceramic, and polymers. Polymeric hollow microspheres are preferred. Such polymeric hollow microspheres may be obtained as a result of the method described in U.S. Pat. No. 4,089,800.

The microspheres may be made of virtually any polymer, organic or inorganic, and may be either thermoplastic or thermosetting. Useful thermoplastic organic polymers, of which the hollow microspheres may be formed, include cellulose derivatives, acrylic resins, polyolefins, polyamides, polycarbonates, polystyrene, copolymers of styrene and other vinyl monomers, vinyl polymers such as homo-or copolymers such as 2-ethyhexylacrylate, methyl methacrylate and copolymers of styrene with other vinyl monomers such as acrylonitrile, acrylic acid, and the like. A preferred hollow microsphere is one made of a styrene-acrylic copolymer. Useful thermosetting resins of which the hollow microspheres may be comprised include inter-polymers of hydroxyl esters of ethylenically-unsaturated monomers, typically admixed with a crosslinking agent, such as an aminoplast resin. Other thermosetting resins which may be used include admixtures of alkyl resin which may also be employed with cross linking agents.

The polymeric hollow microspheres which are suitable for use in the present invention may be obtained commercially. For instance, Ropaque OP-42, Ropaque-62, and Ropaque 62-LO, are commercially available from Rohm and Haas Company in Philadelphia, Pa. Ropaque-62 and Ropaque 62-LO are preferred microspheres.

Ropaque OP-62, also by Rohm and Haas Company, is a commercially available product which is an aqueous emulsion containing 37.5% by weight, of hollow microspheres of an acrylic/styrene copolymer. The low ammonia odor version of the above miscrosphere is available as Ropaque OP-62 LO, which is an aqueous emulsion having a pH of 8.0–9.0, and containing 36–37%, by weight, of hollow microspheres of an acrylic/styrene copolymer. The microspheres have an average outer diameter of 0.40 microns, a dry density of 6.17 lbs/gal, and a wet density of 8.60 lbs/gal.

Any suitable amount of colorant can be used in the preparation of the inventive ink composition as required by the desired color intensity, contrast, and readability. The colorant is preferably used in the range of about 0.5% to about 20% by weight of the ink composition, more preferably in the range of about 2% to about 15% by weight of the ink composition, and even more preferably in the range of about 2% to about 12% by weight of the ink composition.

Acidic Resin

The ink composition of the instant invention comprises an acidic resin which is capable of interacting with the polyamine to provide a water resistant jet printed message. Any suitable polymeric resin having a carboxyl, sulfonic, or phosphoric acid group can be used, with the polymeric resin having carboxyl being preferred. Preferred carboxyl containing acidic resins are those having an acid number in the range of from about 20 to about 400, a weight average molecular weight in the range of from about 500 to about 20,000, a softening point of from about 80° C. to about 120° C., and a glass transition temperature of greater than 25° C., and preferably in the range of from about 40° C. to about 150° C. More preferred carboxyl containing acidic resins have an acid number in the range of from about 100 to about 300, a weight average molecular weight in the range of from about 1000 to about 5,000, a softening point of from about 100° C. to about 110° C., and a glass transition temperature of from about 40° C. to about 70° C.

The acidic resins suitable for use in the ink composition of the present invention include water soluble or water dispersible resins. Thus, the resin may form a true solution or a colloidal suspension that may be used if filterable without substantial separation through a filter having a pore size substantially smaller than the printer capillary tube, for example through a filter having a pore size of about one micron.

Examples of water soluble or dispersible acidic resins that can be used in the instant invention include acrylic resins and styrene-maleic anhydride resins.

Water soluble or dispersible acrylic resins that are suitable for use in the instant invention are made by copolymerizing an unsaturated acid monomer with other monomers such as methyl acrylate, ethyl acrylate, propyl acrylate, butyl acrylate, methyl methacrylate, ethyl methacrylate, propyl methacrylate, butyl methacrylate, hydroxyethyl acrylate, hydroxypropyl acrylate, hydroxybutyl acrylate, hydroxyethyl methacrylate, hydroxypropyl methacrylate, hydroxybutyl methacrylate, and the like, and combinations thereof. Examples of unsaturated acid monomers that can be used in the practice of the instant invention include acrylic acid, methacrylic acid, maleic acid, fumaric acid, itaconic acid, citraconic acid, cinnamic acid, crotonic acid, styrene sulfonic acid, and the like, and combinations thereof. The unsaturated acid monomer can also be in the form of a carboxylate salt with a suitable cation including sodium, potassium, and ammonium, or in the form of an amide such as acrylamide or methacrylamide, or in the form of an anhydride, for instance, maleic anhydride.

The water soluble or dispersible acrylic resin can also include one or more of a comonomer such as styrene, α-methylstyrene, o, p, and m-chloromethyl styrene, styrene substituted with fluoro, chloro, bromo, iodo, nitro, or amino group, acrylonitrile, or butadiene.

There are several water soluble or dispersible acrylic resins that are commercially available and suitable for use in the instant invention. For example, Rohm & Haas Co. in Philadelphia, Pa., sells RHOPLEX™ AC-261, which is an acrylic polymer emulsion. Water soluble or dispersible acrylics can also be obtained from S.C. Johnson & Co. in Racine, Wis., which sells the acrylics under the name of JONCRYL™. Preferred examples of Joncryl acrylics are the Joncryl 555, 586, 678, 680,682, 683, and 67, which are water solubilized copolymers of styrene, alpha methylstyrene, and acrylic acid. Other preferred examples include the styrene-acrylic acid copolymers, Joncryl 538 and 138. Water soluble acrylics can also be obtained from B.F. Goodrich Co. in Akron, Ohio., with the preferred acrylic being CARBOSET™ 526. Joncryl 682, one of the more preferred acrylic resins, has a glass transition temperature of 56° C., an acid number of 238, a weight average molecular weight of 1,700, and a softening point of 105° C.

Other examples of suitable acidic resins include styrene-maleic anhydride copolymers. Various styrene-maleic anhydride copolymers suitable for use in the instant invention are available commercially from Aldrich Chemical Co. in Milwaukee, Wis., as SCRIPSET™ resins from Monsanto Co. in St. Louis, Mo., and as SMA or SMAH resins from ATOCHEM in Malvern, Pa. Several SMA or SMAH resins are available. SMA 1000 is a 1:1 molar styrene-maleic anhydride copolymer having a molecular weight of Mw=5,600 and Mn=1,600, a Tg of 138° C., and an acid number value of 480. SMA 2000 is a 2:1 molar styrene-maleic anhydride copolymer having a molecular weight of Mw=7,700 and Mn=1,700, a Tg of 124° C., and an acid number value of 350. SMA 3000 is a 3:1 molar styrene-maleic anhydride copolymer having a molecular weight of Mw=10,300 and Mn=1,900, a Tg of 124° C. Ammonium salts of partial esters of styrene-maleic anhydride are available as SMAH resins having degree of esterification of 30 to 50%. For instance, SMA 1440H is the ammonium salt of a partial ester of 1:1 molar styrene-maleic anhydride. All of these styrene-maleic anhydride copolymers are suitable for use in the instant invention.

Suitable copolymers can be prepared by any known methods. For instance, a copolymer emulsion of styrene and acrylic acid can be prepared by polymerizing in the emulsion state the suitable monomers using a suitable catalyst. Examples of catalysts include redox catalysts such as ammonium persulfate-ferrous sulfate, Fenton's reagent (ferrous sulfate—hydrogen peroxide), acyl peroxides such as benzoyl peroxide in combination with a reducing agent such as N,N-dimethylaniline, potassium perbromate-ferrous sulfate, potassium permanganate-ferrous sulfate, and the like.

In another method of preparing the copolymer, a mixture of styrene and an acrylic monomer such as methylacrylate or acrylamide can be polymerized using a suitable catalyst, for instance, a free radical initiator such as 2,2'-azobisisobutyronitrile, benzoyl peroxide, or dicumyl peroxide. The copolymer is then hydrolyzed by suitable methods such as by using an acid or alkali to liberate the free carboxyl groups. The resulting styrene-acrylic acid copolymer can be emulsified by any of the known methods of emulsification. For instance, the copolymer may be dissolved in an organic solvent, and the solution then dropped into water with good stirring. Alternatively, an aqueous mixture of the copolymer particles may be treated to enhance the solubility or dispersibility of the copolymer in water, for instance, the aqueous mixture may be treated with a base such as ammonium hydroxide until a finely dispersed emulsion is obtained. The carboxyl group of the acrylic acid may be present in the copolymer as the free acid or the salt of a cation such as ammonium, sodium, or potassium.

Any suitable amount of the acidic resin can be used. The acidic resin is preferably used in an amount in the range of from about 2% to about 20% by weight of the ink composition, more preferably in the range of from about 4% to about 17% by weight of the ink composition, and even more preferably in the range of from about 5% to about 16% by weight of the ink composition.

pH Adjusting Agent

The ink composition of the present invention may preferably comprise a pH adjusting agent. The desired pH will be dependent upon the particular acidic resin used and also to some extent upon the other components employed. Any suitable pH adjusting agent, acid or base, can be used so as to maintain the pH of the ink composition in the range of from about 7.0 to about 11.0, preferably in the range of from about 7.0 to about 10.6. If a base is necessary, any suitable base can be used. Examples of suitable bases include ammonium hydroxide, methylamine, ethylamine, dimethylamine, diethylamine, morpholine, ethanolamine, diethanolamine, triethanolamine, dimethylethanolamine, sodium hydroxide, and potassium hydroxide. Although any suitable base can be used, the residual presence of the base in the printed message may lead to poor water resistance after drying. It is preferred to make use of a base which can be eliminated by evaporation. Thus, it is preferable to use bases such as ammonium hydroxide, methylamine, ethylamine, dimethylamine, diethylamine, triethylamine, and the like, and combinations thereof, for controlling the pH within the desired range. Ammonium hydroxide is a more preferred base.

Any suitable amount of the pH adjusting agent can be used. The pH adjusting agent is used preferably in an amount ranging from about 2% by weight to about 15% by weight of the ink composition.

Humectant

The ink composition of the present invention may preferably comprise a humectant to prevent drying of the ink during the printing operation, as well as during storage of the ink. Humectants are hydrophilic solvents having high boiling points, preferably above 100° C., and more preferably in the range of from about 150° C. to about 250° C. Any suitable humectant known to those of ordinary skill in the art can be used. Examples of suitable humectants include glycols such as ethylene glycol, propylene glycol, glycerin, diglycerin, diethylene glycol, and the like, glycol ethers such as ethylene glycol dimethyl ether, ethylene glycol diethylether, cellosolve, diethylene glycol monoethylether (Carbitol), diethylene glycol dimethylether, and diethylene glycol diethylether, dialkyl sulfoxides such as dimethyl sulfoxide, and other solvents such as sulfolane, N-methyl pyrrolidinone, and the like. Propylene glycol and N-methyl pyrrolidinone are preferred humectants.

Any suitable amount of the humectant can be used, preferably in an amount of from about 0.5% by weight to about 5% by weight of the ink composition, and more preferably in the amount of from about 1% by weight to about 3% by weight of the ink composition.

Biocide

The ink composition of the present invention may preferably comprise a suitable biocide to prevent growth of bacteria, mould or fungus. Any suitable biocide can be used. DOWICIL™ 150, 200, and 75, benzoate salts, sorbate salts, and the like, methyl p-hydroxybenzoate (Methyl Paraben) and 6-acetoxy-2,2-dimethyl-1,3-dioxane (available as Giv Gard DXN from Givaudam Corp.) are examples of suitable biocides, with Giv Gard DXN being a preferred biocide. The biocide can be present in the ink of the instant invention in an amount sufficient to prevent the attack by bacteria, mould, and fungus, which amount can be in the range of from about 0.05% by weight to about 0.5% by weight, preferably in the amount of from about 0.1% by weight of to about 0.3% by weight of the ink composition.

In certain instances, a biocide may be already present in one or more of the components used to prepare the ink. For instance, Ropaque-62 LO formulation is sold with a small amount of a biocide included. In such instances, the amount of biocide added can be suitably reduced.

Defoamer

The ink composition of the present invention may preferably comprise a defoamer to prevent foaming of the ink during its preparation, as well as during the printing operation. Any suitable defoamer known to those of ordinary skill in the art can be used, preferably those that are miscible with water.

Suitable defoamers include silicone defoamers and acetylenic defoamers. Examples of commercially available defoamers include silicone defoamers, such as DC-150, which can be obtained from Dow Corning Co., and SILVET I-77, 720, 722, or 7002, which can be obtained from Union Carbide Co. A preferred defoamer is XRM-3588E™, which can be obtained from Ultra Additives Inc., in Paterson, N.J. XRM-3588E is a defoamer generally used in metal cutting fluids, and has a Brookfield (RVF Spindle #4, 20 RPM, 25° C.) viscosity of 6,000 to 9,000 centipoises, a specific gravity of 0.984–1.032, and a pH of 7.0–8.5 (50% solution). The chemistry of XRM-3588E has not been published, and is believed to be a silicone defoamer.

Examples of acetylenic defoamers include the SURFYNOL™ brand defoamers which can be obtained from Air Products and Chemical Co. in Allentowns, Pa. A number of Surfynol defoamers are available, including the preferred Surfynol 104 (2,4,7,9-tetramethyl-5-decyn-4,7-diol), which is available as a solution in a variety of solvents as Surfynol 104A, Surfynol 104E, Surfynol 104H, and Surfynol 104BC, and other Surfynols such as Surfynol GA, Surfynol SE, Surfynol TG, Surfynol PC, the dimethyl hexynediol, Surfynol 61, the dimethyl octynediol, Surfynol 82, the ethoxylated derivatives of the tetramethyl decynediol, Surfynol 440, Surfynol 465, and Surfynol 485, all of which can be used in the instant invention.

Any suitable amount effective to prevent foaming of the jet ink during preparation and use can be used, preferably an amount in the range of from about 0.01% by weight to about 1% by weight of the ink composition, and more preferably in the range of from about 0.05% by weight to about 0.35% by weight of the ink composition. The weight percentages given above refer to that of the active ingredient, and if the defoamer is sold in a diluted form, the amount of the diluted defoamer used will be proportionately increased.

The jet ink composition of the present invention can be printed on any suitable substrate, including plain paper, bond paper such as GILBERT™ 25% or 100% cotton bond paper, silica coated paper, transparency materials, fabrics, plastics, polymeric films, and the like. The jet ink composition can also be jet printed onto the surface of glass, plastic, rubber, and metal article such as glass bottles, plastic bottles, and aluminum containers. Examples of glass bottles include beer bottles, the returnable and the non-returnable varieties. The jet ink of the present invention may be jet applied onto a variety of glasses, including soda-lime glasses, borosilicate glasses, alumino-silicate glasses, lead glasses, borate glasses, and the like. The above specified types of glass containers may contain an additional coating.

The plastic bottle or container may be made of any kind of plastic. Examples of suitable plastics include polyethylene, polypropylene, PVC, nylons, polyesters such as PET, polycarbonate, polyacetals, polyacrylates, polyurethanes, polyethers, polystyrene, polyimides, and the like. If necessary, these plastic containers may be pretreated, for example, by oxidation, corona treatment, plasma treatment, and the like, to prepare the surface for jet printing.

The jet ink composition may also be applied on metal containers. Any metal container may be jet printed using the jet ink of the instant invention. Examples of metal containers include containers made of aluminum, steel, tin, copper, and the like. Certain containers may need to be pretreated, such as sand blasting, acid cleaning, and the like, to prepare the surface for jet printing.

The present invention also provides an ink composition wherein the composition comprises water in the amount of from about 40% by weight to about 50% by weight of the composition, a pH adjusting agent in the amount of from about 2% by weight to about 15% by weight of the composition, an acidic resin in the amount of from about 5% by weight to about 10% by weight of the composition, polymeric hollow microspheres in the amount of from about 5% by weight to about 15% by weight of the composition, a humectant in the amount of from about 1% by weight to about 2% by weight of the composition, a dendrimer in the amount of from about 1% by weight to about 2% by weight of the composition, a defoamer in the amount of about 0.05% by weight to about 0.35% by weight of the composition, and a biocide in the amount of from about 0.05% by weight to about 0.3% by weight of the composition.

The present invention further provides an ink composition wherein the composition comprises water in the amount of from about 55% by weight to about 65% by weight of the composition, a pH adjusting agent in the amount of from about 2% by weight to about 4% by weight of the composition, an acidic resin in the amount of from about 12% by weight to about 20% by weight of the composition, a pigment in the amount of from about 1% by weight to about 6% by weight of the composition, a humectant in the amount of from about 1% by weight to about 2% by weight of the composition, a dendrimer in the amount of from about 1% by weight to about 2% by weight of the composition, a defoamer in the amount of from about 0.05% by weight to about 0.35% by weight of the composition, and a biocide in the amount of from about 0.1% by weight to about 0.3% by weight of the composition.

The present invention further provides an ink composition, wherein the composition comprises water in the amount of from about 60% by weight to about 70% by weight of the composition, a pH adjusting agent in the amount of from about 2% by weight to about 4% by weight of the composition, an acidic resin in the amount of from about 12% by weight to about 20% by weight of the composition, a dye in the amount of from about 2% by weight to about 6% by weight of the composition, a humectant in the amount of from about 1% by weight to about 2% by weight of the composition, a dendrimer in the amount of from about 1% by weight to about 2% by weight of the composition, a defoamer in the amount of from about 0.05% by weight to about 0.35% by weight of the composition, and a biocide in the amount of from about 0.1% by weight to about 0.3% by weight of the composition.

The following illustrative examples further illustrate the present invention but, of course, should not be construed as in any way limiting its scope.

EXAMPLE 1

This example illustrates the preparation of an ink composition of the present invention comprising a dendrimer, an acidic resin, and acrylic/styrene microspheres.

The following components were combined and mixed using an air mixer until a homogeneous ink composition was obtained.

| Component | % (weight) |
| --- | --- |
| Deionized Water | 47.2 |
| Ammonium Hydroxide (29–30% aqueous solution) | 10.0 |
| Joncryl 682 resin | 8.0 |
| Ropaque OP62-LO resin (36–37% solution) | 30.0 |
| Propylene Glycol | 1.5 |
| Starburst Generation 2 (36% in Methanol) | 3.1 |
| XRM 3588E (50% solution) | 0.2 |
| | 100.0 |

The above ink was used in a continuous ink jet printer, and messages were jet printed on glass bottles and paper. The ink jet characteristics were satisfactory to provide messages of high quality and color strength.

The water resistance of the messages printed on glass beer bottles was tested as follows. Twenty-four hours after printing the messages on beer bottles, the bottles were immersed in a mixture of ice and water, for a period of from about 20 minutes to about 45 minutes. The bottles were removed from the ice-water mixture and the messages were rubbed with fingers. The messages, including any dots constituting the messages, were neither moved nor removed by the rubbing.

The messages were tested under a hot and high humidity condition. The bottles with the messages were exposed in a chamber at about 99% relative humidity and at a temperature of about 100° F. (±5° F.) for about 30 minutes, and upon rubbing with fingers, it was found that the messages were neither moved nor removed. A control ink formula was produced as above but without the dendrimer, and messages were printed on glass beer bottles. The above tests were conducted on the messages. It was found that the printed messages of the ink with the dendrimer had improved water resistance and increased visual intensity over the messages of the control ink.

EXAMPLE 2

This example illustrates the preparation of an ink composition of the present invention comprising a dendrimer, an acidic resin, and a pigment such as carbon black.

The following components were combined and mixed using an air mixer until a homogeneous ink composition was obtained.

| Component | % (weight) |
| --- | --- |
| Deionized Water | 59.6 |
| Ammonium Hydroxide (29–30% aqueous solution) | 10.0 |
| Joncryl 682 resin | 16.0 |
| N-Methyl pyrrolidinone | 1.5 |
| Giv Guard DXN | 0.2 |
| Starburst Generation 3 (44.91% in water) | 2.5 |
| XRM 3588E (50% solution) | 0.2 |
| Carbon Black (18% dispersion) | 10.0 |
| | 100.0 |

The above ink was used in a continuous ink jet printer, and messages were jet printed on glass bottles and paper. The ink jet characteristics were satisfactory to provide messages were of high quality and color strength.

The ink composition was printed on glass bottles and tested as follows. A set of bottles with the messages were exposed in a chamber at about 90% relative humidity and at a temperature of about 40° F. (±5° F.) for about 30 minutes, and upon rubbing with fingers, it was found that the messages were neither moved nor removed by finger rubbing. It was also found that the messages had finger rub resistance after exposure to ice water.

A control ink formula was produced as above but without the dendrimer, and messages were printed on glass beer bottles. The above tests were conducted on the messages. It was found that the printed messages of the ink with the dendrimer had improved water resistance and increased visual intensity over the messages of the control ink.

EXAMPLE 3

This example illustrates the preparation of an ink composition of the present invention comprising a dendrimer, an acidic resin, and a dye. The following components were combined and mixed using an air mixer until a homogeneous ink composition was obtained.

| Component | % (weight) |
| --- | --- |
| Deionized Water | 65.8 |
| Ammonium Hydroxide (29–30% aqueous solution) | 9.7 |
| Joncryl 682 resin | 15.4 |
| N-Methyl pyrrolidinone | 1.5 |
| Giv Guard DXN | 0.2 |
| XRM 3588E (50% solution) | 0.2 |
| Victoria Pure Blue FGA (Basic Blue 81) | 4.0 |
| Starburst Generation 4 (35% solids in Methanol) | 3.2 |
| | 100.0 |

The ink composition was printed on glass bottles and tested as in Example 1. It was found that the messages had finger rub resistance after exposure to ice water as well as to high humidity chamber under cold conditions.

A control ink formula was produced as above but without the dendrimer, and messages were printed on glass beer bottles. The above tests were conducted on the messages. It was found that the printed messages of the ink with the dendrimer had improved water resistance and increased visual intensity over the messages of the control ink.

The present invention further provides an improved process of jet ink printing on glass, metal, plastic, and rubber surfaces, messages having improved condensation, water resistance and visual intensity, the improvement comprising using an ink composition comprising a colorant, a polyamine, and an acidic resin.

The present invention further provides an improved process as described above and wherein the ink composition further comprises water.

The present invention further provides an improved process as described above and wherein the colorant is selected from the group consisting of dyes, pigments, and microspheres.

The present invention further provides an improved process as described above and wherein the microsphere is a polymeric hollow microsphere.

The present invention further provides an improved process as described above and wherein the microsphere is an acrylic/styrene hollow microsphere.

The present invention further provides an improved process as described above and wherein the polyamine is a dendrimer.

The present invention further provides an improved process as described above and wherein said dendrimer is selected from the group consisting of dendrimers having a generation number of 0 to 5.

The present invention further provides an improved process as described above and wherein the dendrimer has primary amine surface groups.

The present invention further provides an improved process as described above and wherein the acidic resin is a resin having carboxyl functionality.

The present invention further provides an improved process as described above and wherein the acidic resin has an acid number of from about 100 to about 300.

The present invention further provides an improved process as described above and wherein the acidic resin is an styrene/acrylic copolymer resin.

The present invention further provides an improved process as described above and wherein the ink composition further comprises a pH adjusting agent.

The present invention further provides an improved process as described above and wherein the pH adjusting agent is ammonium hydroxide.

The present invention further provides an improved process as described above and wherein the ink composition further comprises a humectant.

The present invention further provides an improved process as described above and wherein the humectant is selected from the group consisting of propylene glycol and N-methyl pyrrolidinone.

The present invention further provides an improved process as described above and wherein the composition further comprises a defoamer.

The present invention further provides an improved process as described above and wherein the defoamer is selected from the group consisting of silicone defoamers and acetylenic defoamers.

The present invention further provides an improved process as described above and wherein the composition further comprises a biocide.

All of the references, including patents, patent application, and publications, cited herein are hereby incorporated in their entireties by reference.

While this invention has been described with an emphasis upon the preferred embodiment, it will be obvious to those of ordinary skill in the art that variations of the preferred embodiment may be used and that it is intended that the invention may be practiced otherwise than as specifically described herein. Accordingly, this invention includes all modifications encompassed within the spirit and scope of the invention as defined by the following claims.

What is claimed is:

1. An ink jet ink composition comprising a carrier, a colorant, a polyamine, and an acidic resin, said composition having a viscosity of about 5 centipoises or less at 25° C.

2. The ink jet ink composition of claim 1, wherein said carrier comprises water.

3. The ink jet ink composition of claim 2, wherein said colorant is selected from the group consisting of dyes, pigments, and microspheres.

4. The ink jet ink composition of claim 3, wherein said microsphere is a polymeric hollow microsphere.

5. The ink jet ink composition of claim 4, wherein said microsphere is an acrylic/styrene hollow microsphere.

6. An ink jet ink composition comprising water, a polyamine, an acidic resin, and a colorant selected from the group consisting of dyes, pigments, and acrylic/styrene hollow microspheres, wherein said polyamine comprises a dendrimer.

7. The ink jet ink composition of claim 6, wherein said dendrimer is selected from the group consisting of dendrimers of generation number 0 to 5.

8. The ink jet ink composition of claim 7, wherein said dendrimer has primary amine surface groups.

9. The ink jet ink composition of claim 8, wherein said acidic resin comprises a resin having carboxyl functionality.

10. The ink jet ink composition of claim 9, wherein said acidic resin has an acid number of from about 100 to about 300.

11. The ink jet ink composition of claim 10, wherein said acidic resin comprises a styrene/acrylic copolymer resin.

12. The ink jet ink composition of claim 11, wherein said composition further comprises a pH adjusting agent.

13. The ink jet ink composition of claim 12, wherein said pH adjusting agent comprises ammonium hydroxide.

14. The ink jet ink composition of claim 13, wherein said ink composition further comprises a humectant.

15. The ink jet ink composition of claim 14, wherein said humectant is selected from the group consisting of propylene glycol and N-methyl pyrrolidinone.

16. The ink jet ink composition of claim 15, wherein said composition further comprises a defoamer.

17. The ink jet ink composition of claim 16, wherein said defoamer is selected from the group consisting of silicone defoamers and acetylenic defoamers.

18. The ink jet ink composition of claim 16, wherein said defoamer comprises 2,4,7,9-tetramethyl-5-decyn-4,7-diol.

19. The ink jet ink composition of claim 16, wherein said defoamer comprises a silicone defoamer.

20. The ink jet ink composition of claim 16, wherein said composition further comprises a biocide.

21. The ink jet ink composition of claim 20, wherein said biocide comprises 6-acetoxy-2,2-dimethyl-1,3-dioxane.

22. The ink jet ink composition of claim 21, wherein said dendrimer is a dendrimer of generation number 2.

23. The ink jet ink composition of claim 22, wherein said composition comprises water in the amount of from about 40% by weight to about 50% by weight of said composition, said pH adjusting agent in the amount of from about 2% by weight to about 15% by weight of said composition, said acidic resin in the amount of from about 5% by weight to about 10% by weight of said composition, said polymeric hollow microsphere in the amount of from about 8% by weight to about 15% by weight of said composition, said humectant in the amount of from about 1% by weight to about 2% by weight of said composition, said dendrimer in the amount of from about 1% by weight to about 2% by weight of said composition, said defoamer in the amount of from about 0.05% by weight to about 0.35% by weight of said composition, and said biocide in the amount of from about 0.1% by weight to about 0.3% by weight of said composition.

24. The ink jet ink composition of claim 21, wherein said dendrimer comprises a dendrimer of generation number 3.

25. The ink jet ink composition of claim 24, wherein said colorant comprises carbon black.

26. The ink jet ink composition of claim 25, wherein said composition comprises water in the amount of from about 55% by weight to about 65% by weight of said composition, said pH adjusting agent in the amount of from about 2% by weight to about 4% by weight of said composition, said acidic resin in the amount of from about 12% by weight to about 20% by weight of said composition, said carbon black in the amount of from about 1% by weight to about 3% by weight of said composition, said humectant in the amount of from about 1% by weight to about 2% by weight of said composition, said dendrimer in the amount of from about 1% by weight to about 2% by weight of said composition, said defoamer in the amount of from about 0.05% by weight to about 0.35% by weight of said composition, and said biocide in the amount of from about 0.1% by weight to about 0.3% by weight of said composition.

27. The ink jet ink composition of claim 21, wherein said dendrimer comprises a dendrimer of generation number 4.

28. The ink jet ink composition of claim 27, wherein said colorant comprises Victoria Pure Blue FGA.

29. The ink jet ink composition of claim 28, wherein said composition comprises water in the amount of from about 60% by weight to about 70% by weight of said composition, said pH adjusting agent in the amount of from about 2% by weight to about 4% by weight of said composition, said acidic resin in the amount of from about 12% by weight to about 20% by weight of said composition, said colorant in the amount of from about 2% by weight to about 6% by weight of said composition, said humectant in the amount of from about 1% by weight to about 2% by weight of said composition, said dendrimer in the amount of from about 1% by weight to about 2% by weight of said composition, said defoamer in the amount of from about 0.05% by weight to about 0.35% by weight of said composition, and said biocide in the amount of from about 0.1% by weight to about 0.3% by weight of said composition.

30. In an improved process of jet ink printing on glass, metal, and plastic surfaces, messages having improved condensation, water resistance and visual intensity, the improvement comprising using an ink composition comprising a carrier, a colorant, a polyamine, and an acidic resin, said composition having a viscosity of about 5 centipoises or less at 25° C.

31. The improved process of claim 30, wherein said carrier comprises water.

32. The improved process of claim 31, wherein said colorant is selected from the group consisting of dyes, pigments, and microspheres.

33. The improved process of claim 32, wherein said microsphere is a polymeric hollow microsphere.

34. The improved process of claim 33, wherein said microsphere comprises an acrylic/styrene hollow microsphere.

35. An improved process of jet printing on glass, metal, and plastic surfaces, messages having improved condensation, water resistance and visual intensity, the improvement comprising using an ink composition comprising water, a polyamine, an acidic resin, and a colorant selected from the group consisting of dyes, pigments, and acrylic/styrene hollow microspheres, wherein said polyamine comprises a dendrimer.

36. The improved process of claim 35, wherein said dendrimer is selected from the group consisting of dendrimers of generation number 0 to 5.

37. The improved process of claim 36, wherein said dendrimer has primary amine surface groups.

38. The improved process of claim 37, wherein said acidic resin comprises a resin having carboxyl functionality.

39. The improved process of claim 38, wherein said resin has an acid number of from about 100 to about 300.

40. The improved process of claim 39, wherein said resin comprises a styrene/acrylic copolymer resin.

41. The improved process of claim 40, wherein said composition further comprises a pH adjusting agent.

42. The improved process of claim 41, wherein said pH adjusting agent comprises ammonium hydroxide.

43. The improved process of claim 42, wherein said ink composition further comprises a humectant.

44. The improved process of claim 43, wherein said humectant is selected from the group consisting of propylene glycol and N-methyl pyrrolidinone.

45. The improved process of claim 44, wherein said composition further comprises a defoamer.

46. The improved process of claim 45, wherein said defoamer is selected from the group consisting of silicone defoamers and acetylenic defoamers.

47. The improved process of claim 46, wherein said composition further comprises a biocide.

* * * * *